(12) United States Patent
Fu

(10) Patent No.: US 11,640,703 B2
(45) Date of Patent: May 2, 2023

(54) METHOD FOR CLASSIFYING MEASURING POINTS OF A POINT CLOUD

(71) Applicant: Robert Bosch GmbH, Stuttgart (DE)

(72) Inventor: Chengxuan Fu, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 54 days.

(21) Appl. No.: 17/328,952

(22) Filed: May 24, 2021

(65) Prior Publication Data
US 2021/0374400 A1    Dec. 2, 2021

(30) Foreign Application Priority Data

May 29, 2020 (DE) .................. 10 2020 206 815.1

(51) Int. Cl.
*G06V 10/75* (2022.01)
*G06F 18/241* (2023.01)

(52) U.S. Cl.
CPC .......... *G06V 10/757* (2022.01); *G06F 18/241* (2023.01); *G06F 2218/12* (2023.01)

(58) Field of Classification Search
CPC ............. G06K 9/00536; G06K 9/6268; G06K 9/6267; G06V 10/757; G06T 7/66; G06T 2207/10028
See application file for complete search history.

(56) References Cited

U.S. PATENT DOCUMENTS

2015/0110367 A1* 4/2015 Kumar ............... G06V 40/1312
382/124

2019/0178989 A1    6/2019 Tsai et al.
2020/0043186 A1* 2/2020 Selviah ............. G06V 10/7515

FOREIGN PATENT DOCUMENTS

CN    104143194 B  *  9/2017
CN    110389586 A  * 10/2019 ............. G01S 17/42
(Continued)

OTHER PUBLICATIONS

Chu et al. Enhanced ground segmentation method for Lidar point clouds in human-centric autonomous robot system, May 9, 2019, Hum. Cent. Comput. Inf. Sci. 9:17; p. 1-14. (Year: 2019).*
(Continued)

*Primary Examiner* — Matthew C Bella
*Assistant Examiner* — Kathleen M Broughton
(74) *Attorney, Agent, or Firm* — Norton Rose Fulbright US LLP; Gerard Messina

(57) ABSTRACT

A method for classifying measuring points of a point cloud ascertained by at least one sensor, in particular, a point cloud ascertained from a LIDAR sensor, a radar sensor and/or a camera sensor, via a control unit. Local surface vectors to adjacent measuring points are ascertained for each measuring point of the point cloud. For each local surface vector, respectively one angle is calculated between the local surface vectors with respect to a gravity vector. A maximal surface vector having a maximal angle with respect to the gravity vector and a standardized surface vector are ascertained for each measuring point of the point cloud based on the calculated angles. Each measuring point of the point cloud includes a standardized surface vector and/or includes a maximal surface vector having an angle with respect to the gravity vector above a limiting value being classified as a non-ground point.

5 Claims, 4 Drawing Sheets

(56) References Cited

FOREIGN PATENT DOCUMENTS

| CN | 106022381 B | * | 5/2020 | ........... G06K 9/6256 |
| CN | 111102986 A | * | 5/2020 | ............. G01S 17/89 |

OTHER PUBLICATIONS

Mao, et al.: "Pedestrian detection and recognition using ildarfor autono-mous driving", 2019 International Conference on Optical Instruments and Technology: Optical Sensors and Applications. International Society for Optica and Photonics, 2019, Beijing, China, https://www.spiedigitallibrary.org/conference-proceedings-of-spie, downloaded on Apr. 27, 2021, pp. 1-12.

Morris, Daniel D.: "Obstacles and Foliage Discrimination using Lidar", Unmannes Systems Technology XVIII, International Society for Optics and Photonics, (2016), pp. 1-12.

* cited by examiner

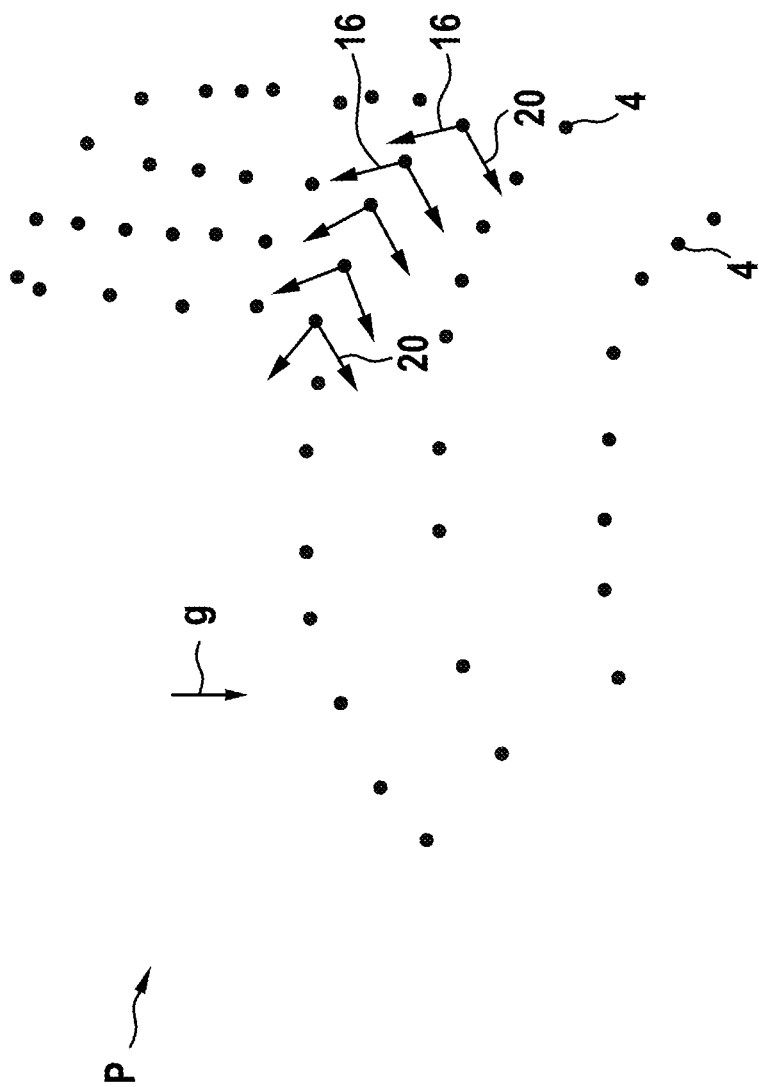

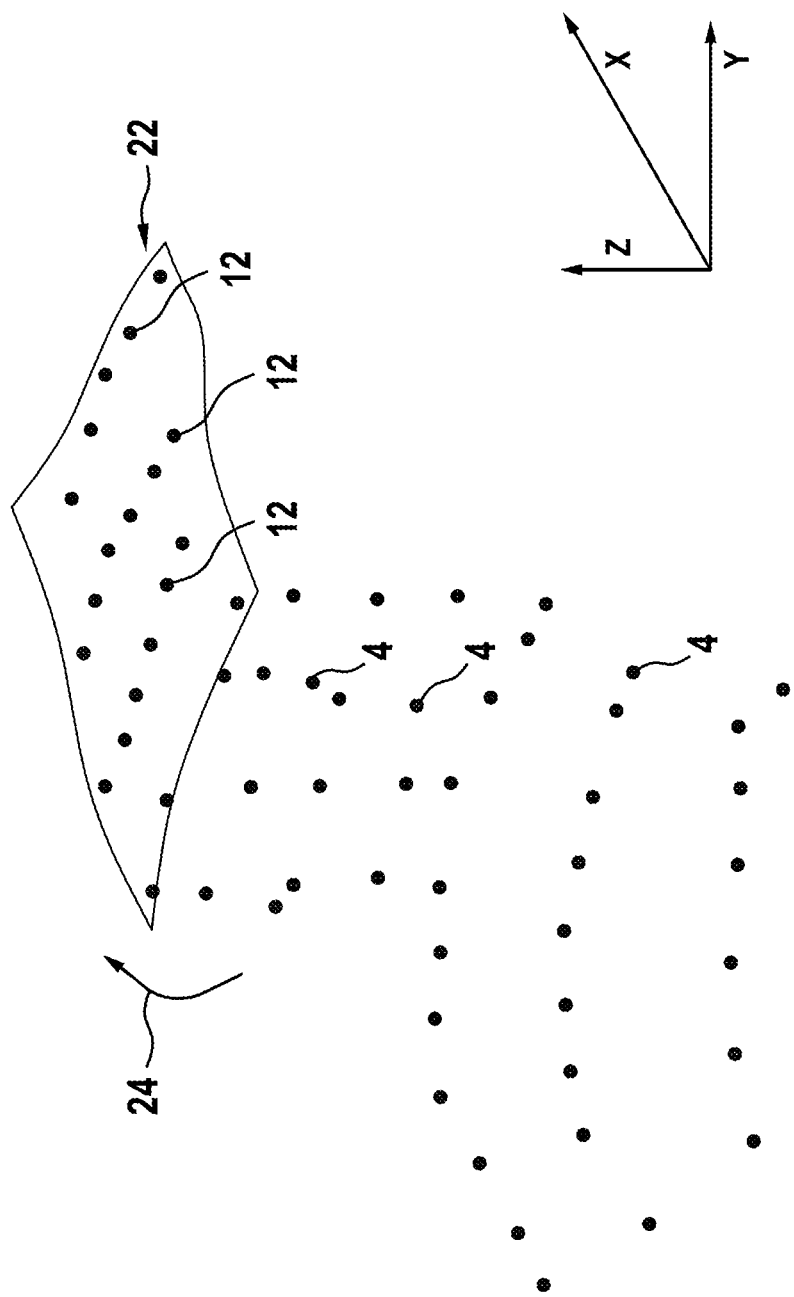

METHOD FOR CLASSIFYING MEASURING POINTS OF A POINT CLOUD

CROSS REFERENCE

The application claims the benefit under 35 U.S.C. § 119 of German Patent Application No. DE 102020206815.1 filed on May 29, 2020, which is expressly incorporated herein by reference in its entirety.

FIELD

The present invention relates to a method for classifying measuring points of a point cloud ascertained by at least one sensor, in particular, a point cloud ascertained from a LIDAR sensor, a radar sensor and/or a camera sensor. The present invention also relates to a control unit, to a computer program and to a machine-readable memory medium.

BACKGROUND INFORMATION

In the field of automated driving assistance functions and automated driving, LIDAR sensors, radar sensors or camera sensors are usually used as surroundings sensors for carrying out surroundings detection. The surroundings may be scanned with the aid of surroundings sensors in order to ascertain a plurality of measuring points in the form of a three-dimensional point cloud including pieces of distance information to objects in the scanning area. In the process, propagation time measurements, for example, or so-called time-of-flight measurements are carried out and distances are calculated from the measured propagation times that are covered by the emitted radiation.

To detect objects from the measuring points of the point cloud, the measuring points must normally be classified into ground points, which are assigned to a substrate, and into non-ground points. A subsequent object recognition takes place based on the measuring points classified as non-ground points. Methods for classifying measuring points of a point cloud are available. The conventional methods, however, are complex and thus require high computing power. Due to the complexity of the methods, a real-time processing of the measured data is possible only with a major technical effort. In addition, the efficiency of the conventional methods with respect to false-positive rates and false-negative rates is insufficient.

SUMMARY

An object of the present invention is to provide a method for carrying out a classification of measured data, which includes a reduced computing power requirement and is real-time capable.

This object may be achieved with the aid of example embodiments of the present invention. Advantageous embodiments of the present invention are disclosed herein.

According to one aspect of the present invention, a method is provided for classifying measuring points of a point cloud ascertained by at least one sensor. The at least one sensor may ascertain measured data in the form of measuring points and may, for example, be designed as a LIDAR sensor, a radar sensor and/or a camera sensor.

The method may be carried out by a control unit. In this case, the control unit may be designed as a field programmable gate array (FPGA), an application-specific integrated circuit (ASIC), a microprocessor, a computer or as a hardware accelerator.

The algorithm may also be implemented in FPGA, ASIC or other kinds of hardware accelerators (HW) in order to reduce the CPU load.

In accordance with an example embodiment of the present invention, in one step of the method, local surface vectors to adjacent measuring points are ascertained for each measuring point of the point cloud. The local surface vectors may be ascertained as normal vectors and are directed to adjacent measuring points. In the process, for each measuring point, the surface vectors to its adjacent points or adjacent measuring points is initially calculated. Optionally, individual unknown surface vectors may also be calculated via a cross product of two known surface vectors.

For each local surface vector, respectively one angle is calculated between the respective local surface vector with respect to a gravity vector. A maximal surface vector is subsequently ascertained for each measuring point of the point cloud having a maximal angle with respect to the gravity vector and a standardized surface vector is ascertained based on the calculated angles.

The gravity vector is directed perpendicularly to a substrate or ground corresponding to the earth's gravitational pull.

The angle between a local surface vector with respect to the gravity vector may preferably be in a range between 0° and 90° including 0° and 90°. With an angle of more than 90°, it is possible to ascertain the angle in the form of a subtraction from 180°.

A maximal surface vector may be determined for each measuring point. Each measuring point may be assigned at least one surface vector. In the case of multiple surface vectors assigned to one measuring point, which point from the measuring point to adjacent measuring points, the surface vector at the greatest angle with respect to the gravity vector may be defined as the maximal surface vector. The maximal surface vector may thus be oriented essentially in parallel with respect to an X-Y plane, as a result of which the angle is maximal with respect to the gravity vector.

The standardized surface vector may be calculated by forming a mean value from all surface vectors of a measuring point. In this case, an angle between the standardized surface vector and the gravity vector may also be ascertained.

In accordance with an example embodiment of the present invention, in one further step, each measuring point of the point cloud including a standardized surface vector and/or a maximal surface vector at an angle with respect to the gravity vector above a limiting value is classified as a non-ground point. The limiting value may, in particular, lie in an angular range of 45° to 90°. In this way, measuring points including a standardized surface vector and/or including a maximal surface vector are classified as non-ground points, which have an excessively large angle with respect to the gravity vector. This step is relevant in order to avoid false-positive results in the further processing, since the measuring points in the algorithm classified as non-ground points are not excluded from an optional region growing method, via which the region growing method may be accelerated.

In a false-positive result, measuring points of an object may be classified as ground objects. In a false-negative result, measuring points, which map the ground, are classified as non-ground points.

According to one further aspect of the present invention, a control unit is provided, the control unit being configured to carry out the method. The control unit may, for example, be an onboard control unit, a vehicle-external control unit or an external server unit such as, for example, a cloud system.

According to one aspect of the present invention, a computer program is also provided including commands which, upon execution of the computer program by a computer or a control unit, prompt the computer or control unit to carry out the method according to the present invention. According to one further aspect of the present invention, a machine-readable memory medium is provided, on which the computer program according to the present invention is stored.

The control unit may, for example, be used in vehicles, which are operable according to the BASt standard in an assisted, semi-automated, highly automated and/or fully automated or driverless manner. Such a vehicle may, for example, be a passenger vehicle, a truck, a robotaxi and the like. The vehicle is not restricted to an operation on roads. Instead, the vehicle may also be designed as a watercraft, aircraft such as, for example, a transport drone and the like.

According to one exemplary embodiment of the present invention, non-classified adjacent measuring points are ascertained from measuring points classified as non-ground points, non-classified, adjacent measuring points being classified as a non-ground point from measuring points classified as non-ground points having an identical azimuth angle and a higher or equal elevation angle. With the aid of this measure, all non-classified adjacent measuring points are compared with respect to their difference in height with the measuring points already classified as non-ground points. If the height or a z value of the adjacent, non-classified measuring points is greater than the measuring points classified as non-ground points, then these measuring points may also be classified as non-ground points. This approach may be repeated for each row and each column of the measuring points of the point cloud. In this way, the likelihood of an occurrence of false-positive results may be further reduced.

According to one further specific embodiment of the present invention, a height value or z value for each non-classified measuring point of the point cloud is compared with a height of the sensor above a ground, each non-classified measuring point of the point cloud being classified as a ground point if its height value essentially matches the height of the sensor above the ground. In this way, the remaining measuring points with no classification are subjected to a comparison of the z values. If the z value of one measuring point essentially matches the gravity vector and the direction of the surface vector matches the direction of the gravity vector, this measuring point is also classified as a ground point.

According to one further exemplary embodiment of the present invention, the measuring points of the point cloud classified as ground points are ascertained using at least one non-classified adjacent measuring point and a region growing method is applied. The remaining adjacent measuring points in this case are classified neither as non-ground points nor as ground points. With the aid of this measure, a key feature is utilized for identifying further ground points, in which a similarity of surface vectors of adjacent ground points is present. Further criteria such as, for example, differences in the z value may also be taken into consideration by the region growing method. With the aid of this step, it is possible, in particular, to avoid false-negative results, which may appear, for example, at hills.

According to one further specific embodiment of the present invention, the measuring points of the point cloud are at least buffered in a structured form including a plurality of rows and columns. The memory unit in this case may be a memory unit integrated into the control unit or an external memory unit. With the structured provision of the measuring points, it is possible to access each measuring point based on a row number and a column number. In this way, adjacent measuring points may, in particular, be identified for each measuring point.

The measuring points of a column preferably have an identical elevation angle and the measuring points of a row or line have an identical azimuth angle.

BRIEF DESCRIPTION OF THE DRAWINGS

Preferred exemplary embodiments of the present invention are explained in greater detail below with reference to highly simplified representations.

FIG. 3 schematically shows a comparison of maximal surface vectors of measuring points with respect to the gravity vector.

FIG. 4 schematically shows a comparison between measuring points classified as non-ground points and non-classified measuring points having a greater z value.

DETAILED DESCRIPTION OF EXAMPLE EMBODIMENTS

FIGS. 1 through 4 schematically show representations for illustrating a method according to one specific embodiment of the present invention. The method is used to classify measuring points 4 ascertained by at least one sensor 2.

Figure 1:
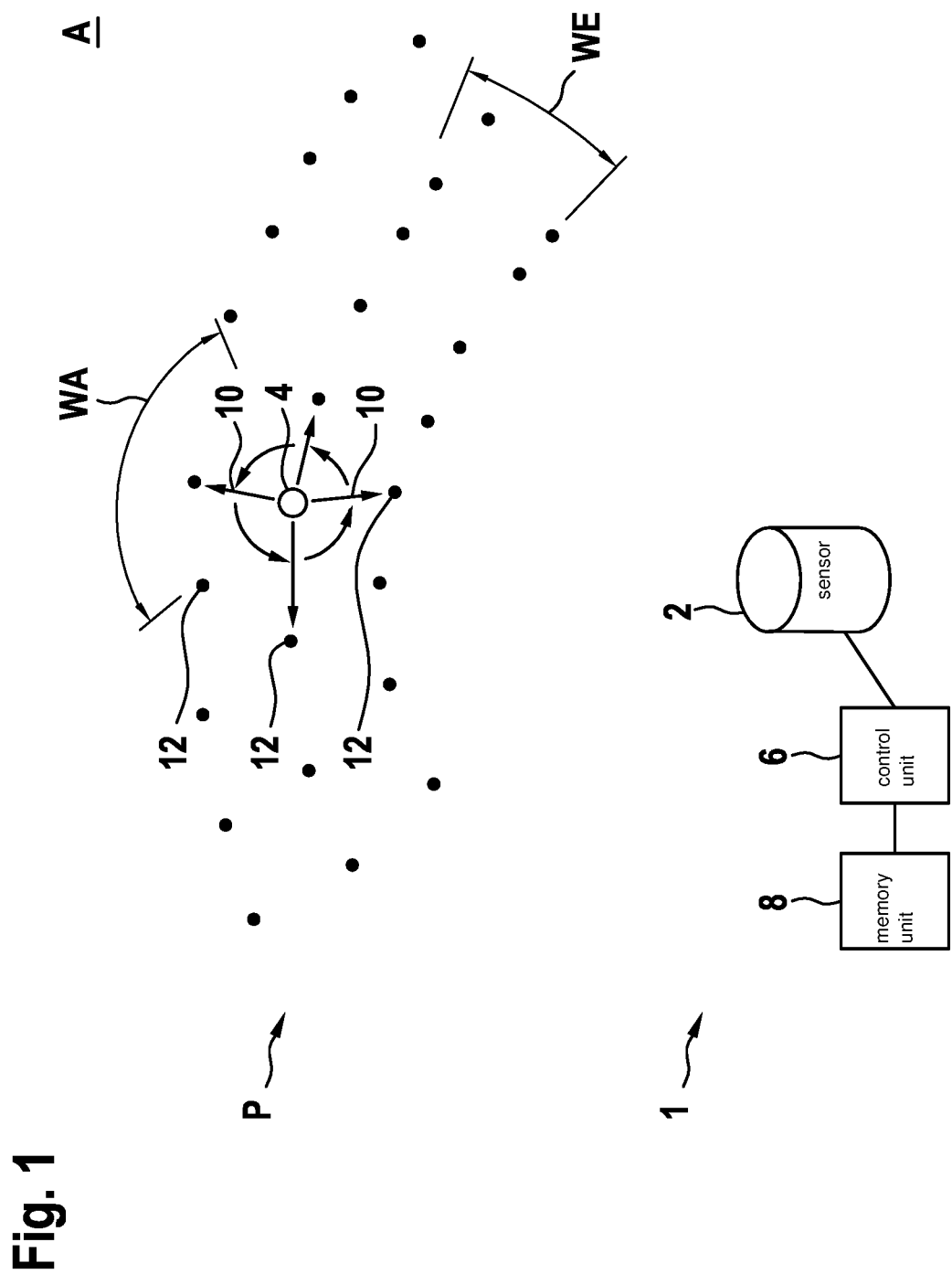
FIG. 1 schematically shows a representation of an arrangement including an exemplary point cloud for illustrating a method according to one specific example embodiment of the present invention.

A schematic representation of an arrangement 1 including an exemplary point cloud P is depicted in FIG. 1. Arrangement 1 includes a sensor 2, which is designed, for example, as a LIDAR sensor. Alternatively or in addition, sensor 2 may include a radar sensor and/or a camera sensor.

Sensor 2 may scan a scanning area A and collect measured data in the form of measuring points 4. Measuring points 4 are present in a grid or a table and may be assigned to rows and columns of a table. The rows correspond in this case to an azimuth angle WA and the columns correspond to an elevation angle WE.

Sensor 2 is connected to a control unit 6 in a data-transferring manner. Control unit 6 may receive measuring points 4 of sensor 2 and store them at least temporarily in a memory unit 8.

Memory unit 8 may be designed as a machine-readable memory medium, on which a computer program is stored, which includes commands which, upon execution of the computer program by control unit 6, prompt the control unit to carry out the method.

A measuring point 4 including 4 surface vectors 10 to adjacent measuring points 12 is depicted by way of example in FIG. 1. Local surface vectors 10 to adjacent measuring points 12 are ascertained for each measuring point 4 of point cloud P.

Figure 2:
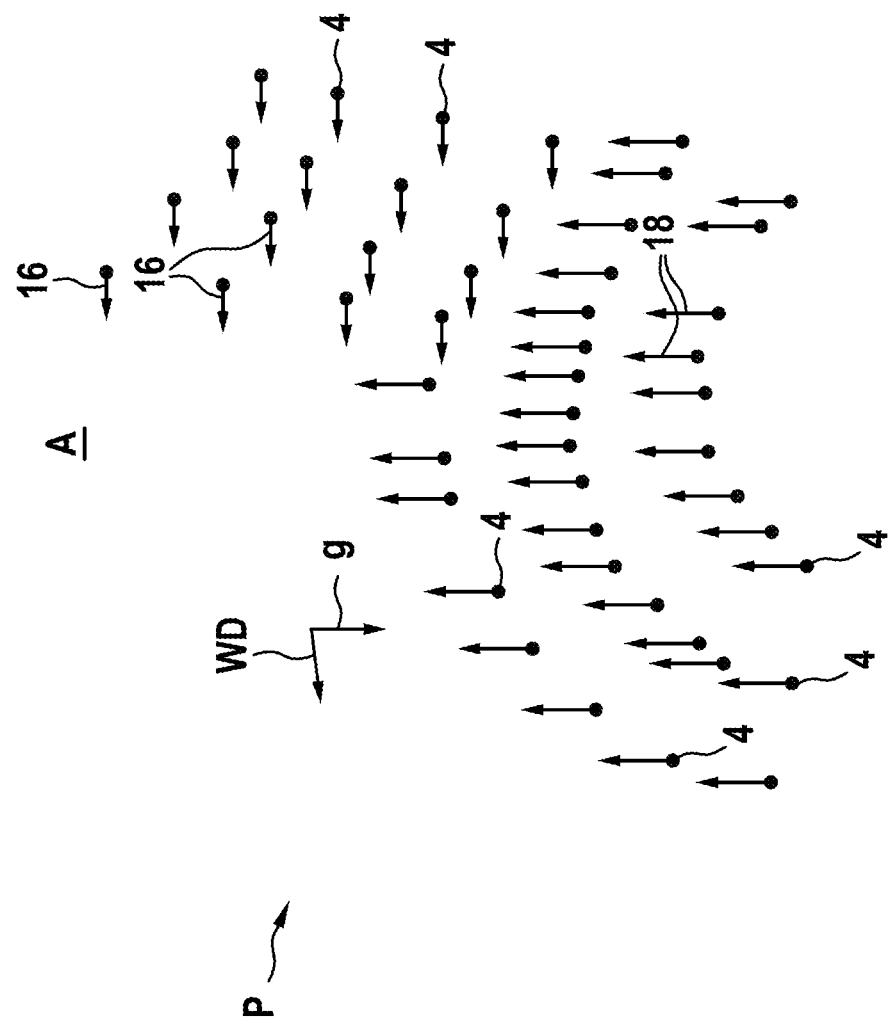
FIG. 2 schematically shows a comparison of standardized surface vectors of measuring points with respect to a gravity factor.

FIG. 2 schematically shows a comparison of standardized surface vectors 16, 18 of measuring points 4 with respect to a gravity vector g. Arrangement 1 is not depicted for the sake of clarity. In this case, standardized surface vectors 16 of measuring points 4 classified as non-ground points and standardized surface vectors 18 of measuring points 4 classified as ground points are depicted.

In the step illustrated in FIG. 2, one angle WD each between local surface vectors 10 with respect to gravity vector g is calculated for each local surface vector 10. In this case, the relation of ground points may be utilized, which extend more in parallel to gravity vector g than the non-ground points.

FIG. 3 schematically shows a comparison of maximal surface vectors 20 of measuring points 4 with respect to gravity vector g. The virtually perpendicular orientation of a maximal surface vector 20 on an exemplary building wall with respect to a standardized surface vector 18, in particular, is illustrated.

Thus, it is necessary to use both maximal surface vector 20 as well as standardized surface vectors 16, 18 for the classification in order to robustly carry out the method.

A maximal surface vector 20 and a standardized surface vector 16, 18 are ascertained for each measuring point 4 of point cloud P based on calculated angles WD. Maximal surface vector 20 corresponds to one of multiple surface vectors 10 of one measuring point 4, which has a largest angle WD with respect to gravity vector g. Thus, maximal surface vector 20 is situated essentially in parallel to an x-y plane.

In one further step, each measuring point 4 of point cloud P including a standardized surface vector 16 and/or a maximal surface vector 20 having an angle WD with respect to gravity vector g above a limiting value is classified as a non-ground point.

A comparison between measuring points 4 classified as ground points and non-classified measuring points 12 having a greater z value z is schematically represented in FIG. 4. Measuring points 4 of point cloud P classified as ground points are ascertained using at least one non-classified adjacent measuring point 12 and a region growing method is applied. Remaining adjacent measuring points 12 in this case are classified neither as non-ground points nor as ground points. With the aid of this measure, it is possible to utilize similarities of surface vectors of adjacent ground points. For example, a slightly elevated surface 22 may be registered in this way and may be classified as pertaining to the ground. Arrow 24 illustrates an exemplary direction of the region growing method.

What is claimed is:

1. A method for classifying measuring points of a point cloud ascertained by at least one sensor, the method comprising:
    ascertaining the point cloud, using a sensor, via a control unit, the sensor including a LIDAR sensor, and/or a radar sensor and/or a camera sensor;
    ascertaining local surface vectors to adjacent measuring points for each measuring point of the point cloud;
    calculating, for each of the local surface vectors, respectively an angle between the local surface vectors with respect to a gravity vector;
    ascertaining a maximal surface vector having a maximal angle with respect to the gravity vector and a standardized surface vector, for each of the measuring points of the point cloud, based on the calculated angles; and
    classifying each of the measuring points of the point cloud including a standardized surface vector and/or including a maximal surface vector having an angle with respect to the gravity vector above a limiting value, as a non-ground point, wherein:
    a height value is compared with a height of the sensor above a ground for each non-classified measuring point of the point cloud, each non-classified measuring point of the point cloud being classified as a ground point when its height value matches the height of sensor above the ground, and
    the measuring points of the point cloud classified as ground points are ascertained using at least one non-classified, adjacent measuring point, and a region growing method is applied.

2. The method as recited in claim 1, wherein non-classified, adjacent measuring points are ascertained from the measuring points classified as non-ground points, non-classified, adjacent measuring points of the measuring points classified as non-ground points having an identical azimuth angle and a higher or identical elevation angle being classified as non-ground points.

3. The method as recited in claim 1, wherein the measuring points of the point cloud are at least buffered in a memory unit in a structured form including a plurality of rows and columns.

4. A control unit configured to classify measuring points of a point cloud ascertained by at least one sensor, the control unit configured to:
    ascertain the point cloud using a sensor, the sensor including a LIDAR sensor, and/or a radar sensor and/or a camera sensor;
    ascertain local surface vectors to adjacent measuring points for each measuring point of the point cloud;
    calculate, for each of the local surface vectors, respectively an angle between the local surface vectors with respect to a gravity vector;
    ascertain a maximal surface vector having a maximal angle with respect to the gravity vector and a standardized surface vector, for each of the measuring points of the point cloud, based on the calculated angles; and
    classify each of the measuring points of the point cloud including a standardized surface vector and/or including a maximal surface vector having an angle with respect to the gravity vector above a limiting value, as a non-ground point, wherein:
    a height value is compared with a height of the sensor above a ground for each non-classified measuring point of the point cloud, each non-classified measuring point of the point cloud being classified as a ground point when its height value matches the height of sensor above the ground, and
    the measuring points of the point cloud classified as ground points are ascertained using at least one non-classified, adjacent measuring point, and a region growing method is applied.

5. A non-transitory machine-readable memory medium on which is stored a computer program for classifying measuring points of a point cloud ascertained by at least one sensor, the computer program, when executed by a computer, causing the computer to perform the following steps:
    ascertaining the point cloud using a sensor, the sensor including a LIDAR sensor, and/or a radar sensor and/or a camera sensor;
    ascertaining local surface vectors to adjacent measuring points for each measuring point of the point cloud;
    calculating, for each of the local surface vectors, respectively an angle between the local surface vectors with respect to a gravity vector;
    ascertaining, a maximal surface vector having a maximal angle with respect to the gravity vector and a standardized surface vector, for each of the measuring points of the point cloud, based on the calculated angles; and classifying each of the measuring points of the point cloud including a standardized surface vector and/or including a maximal surface vector having an angle with respect to the gravity vector above a limiting value, as a non-ground point, wherein:
a height value is compared with a height of the sensor above a ground for each non-classified measuring point of the point cloud, each non-classified measuring point of the point cloud being classified as a ground point when its height value matches the height of sensor above the ground, and
the measuring points of the point cloud classified as ground points are ascertained using at least one non-classified, adjacent measuring point, and a region growing method is applied.

\* \* \* \* \*